United States Patent
Hutson et al.

(10) Patent No.: US 8,104,683 B1
(45) Date of Patent: Jan. 31, 2012

(54) HAND-OPERATED DOCUMENT READER/IMAGER WITH DOCUMENT RETENTION DEVICE INCLUDING MANUALLY-POWERED ANTI-SKEW METHODOLOGY

(75) Inventors: Sammy C. Hutson, Novi, MI (US); John C Gudenburr, Canton, MI (US); Michael J. Moore, Beverly Hills, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 1050 days.

(21) Appl. No.: 11/949,860

(22) Filed: Dec. 4, 2007

(51) Int. Cl.
*G06K 7/08* (2006.01)
(52) U.S. Cl. ........ 235/449; 235/439; 235/442; 235/446; 235/454
(58) Field of Classification Search .................. 235/439, 235/442, 446, 449, 454; 382/139
See application file for complete search history.

(56) References Cited

U.S. PATENT DOCUMENTS

| | | | | |
|---|---|---|---|---|
| 5,256,863 A * | 10/1993 | Ferguson et al. | ............... | 705/21 |
| 5,519,511 A * | 5/1996 | Tanahashi | ..................... | 358/473 |
| 2008/0130070 A1 * | 6/2008 | Walker et al. | ................. | 358/496 |

* cited by examiner

*Primary Examiner* — Daniel Hess
*Assistant Examiner* — Tabitha Chedekel
(74) *Attorney, Agent, or Firm* — Honigman Miller Schwartz and Cohn LLP (57) ABSTRACT

A hand-operated document processor includes a base including a perforated bed for receiving a document containing magnetic ink character data to be read and recognized. The base defines a chamber under the perforated bed. A manually operated moving magnetic ink character recognition (MICR) subsystem includes a MICR read head and is attached to the base such that movement of the subsystem causes the MICR read head to pass over the magnetic ink character data on the document. MICR reading and recognition logic receives the signal from the MICR read head. A document positioning and retentioning device connected to the base includes a manually-powered anti-skew device for creating a vacuum. The created vacuum is provided to the chamber under the perforated bed such that the vacuum, acting through the perforations, securely holds the document during the scanning operation.

15 Claims, 6 Drawing Sheets

HAND-OPERATED DOCUMENT READER/IMAGER WITH DOCUMENT RETENTION DEVICE INCLUDING MANUALLY-POWERED ANTI-SKEW METHODOLOGY

BACKGROUND OF THE INVENTION

1. Field of the Invention

The invention relates to document processing, document imaging, and magnetic ink character recognition. The invention further relates to hand-operated document readers/imagers, and to methods and systems for restraining a document during processing with a hand-operated document reader/imager to avoid document skew.

2. Background Art

A typical document processing system includes a feeder and a separator in the document-feeding portion of the system, and a series of roller pairs or belts in the document-transporting portion of the system. In the feeding portion of the system, the feeder acts with the separator to feed documents singly, in order, from a stack. In the transporting portion of the system, the roller pairs and/or belts convey the documents, one at a time, past other processing devices such as readers, printers, and sorters that perform operations on the documents. The feeder is typically a feed wheel, but may take other forms. The separator may be a wheel, but also may take other forms such as a belt. Further, the components in the transporting portion of the system may take a variety of forms.

In addition to large document processing systems that handle stacks of documents, smaller systems also exist. These smaller document processing systems may handle smaller stacks of documents, or may even handle single documents, fed one at a time. There are also hand-operated document readers/imagers.

Banks, credit unions, and other financial institutions use document processing systems to regularly process checks, deposit slips, and other types of bank documents in order to execute financial transactions efficiently. Document processing systems have therefore become quite prevalent in the industry. Typically, information is printed on these documents in magnetic ink which can be read both by the human eye and a computer. This form of printing is read by a process called magnetic ink character recognition (MICR). As part of the recognition process, a MICR magnetic read head is used to read the information printed on the document.

Conventional approaches to MICR reading and recognition generally involve determining peak position information for a waveform generated by a single gap magnetic read head. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in ANS X9.100-20-2006 (formerly published as X9.27) "Print and Test Specifications for Magnetic Ink Printing (MICR)" as published by Accredited Standards Committee X9, Inc., Annapolis, Md., United States. Based on the design of the standard E-13B character set, in order that a MICR reader reliably read with a high correct character read rate and with a very low substitution rate, the document velocity must be precisely known during reading or otherwise be speed-controlled so that it does not vary.

These conventional approaches are acceptable when the velocity of the document is either known or can be controlled. In fact, conventional approaches to MICR typically involve rather complex scheines for controlling the velocity of the document or attempting to measure its velocity at different times as the document moves past the MICR read head. There has also been an approach to MICR reading and recognition that utilizes a dual gap read head to eliminate the need for precise knowledge or control of the document velocity.

In a hand-operated document reader/imager, the document is placed on a base and the MICR/image device is moved over the document from right to left, which is the traditional direction of larger document readers. During this movement, the MICR characters are recognized and the front image of the document is captured.

In more detail, the operational sequence of a manually operated linear check or document scanning device is as follows. A check or document is positioned on the bed of the device. The module that holds the contact image sensor and the magnetic read head is moved across the check or document, with the module being guided by a linear rod. The magnetic read head reads the MICR code line at the bottom of the document, and the contact image sensor scans the document. Data from both devices are passed to the electronics of the system for processing.

In order for the image sensor and magnetic read head to properly read the check or document, the speed of the module must be known over the entire length of the item being scanned. The speed of the scan can be measured by any one of a number of speed measuring devices. The greater the variation of speed, the more sophisticated, and therefore more expensive, the electronics must be, as well as the greater the chance of error.

The contact image sensor has a maximum speed limit, beyond which it will fail to operate properly. And, the MICR reader has a minimum speed limit, below which it cannot reliably operate. Accordingly, the speed of the scan must remain between these limits.

There is a 0.010 inch gap between the contact image sensor and the bed of the device. The check or document must be held firmly in place as the contact image sensor and magnetic read head are scanned over the document. If the check or document moves, an unusable image will result, such as a skewed image, and this situation will negatively impact the processing flow. Document movement during scanning tends to occur with checks or documents that have folds, creases, dog ears, or other mutilations. In general, any portion of the document that sits higher than the 0.010 inch gap will create friction against the contact image sensor and result in check or document movement.

The MICR read head is actually in contact with the document during scanning, and this friction also may skew the check or document, resulting in misreads and/or no reading of the MICR code line.

In existing document handling equipment, the only way that the check or document may be restrained is by any number of conventional clamping methods that restrain the document from both sides; however, in a scanning/reading system, the side of the document being scanned needs to be unobstructed.

For the foregoing reasons, there is a need for an improved method and system for providing document retention wherein the side of the document being scanned is not obstructed.

SUMMARY OF INVENTION

It is an object of the invention to provide an improved hand-operated document reader/imager with a document retention device including manually-powered anti-skew methodology.

According to the invention, a hand-operated document processor comprises a base for receiving a document containing magnetic ink character data to be read and recognized, and a moving magnetic ink character recognition (MICR) subsystem. The subsystem includes a MICR read head and is attached to the base such that movement of the subsystem causes the MICR read head to pass over the magnetic ink character data on the document. MICR reading and recognition logic receives the signal from the MICR read head. The moving MICR subsystem further comprises an image sensor that passes over the document as the MICR read head passes over the magnetic ink character data on the document.

Typically, the operator provides the force necessary to drive the moving MICR subsystem. In operation of the hand-operated document processor, with the MICR subsystem at the start position, the document is positioned on the base of the hand-operated document reader/imager. The operator slides the MICR subsystem across the document.

In more detail, the invention comprehends a document positioning and retentioning device incorporating manually-powered anti-skew methodology for use in a hand-operated document reader/imager. In one implementation, the bed or base of the device includes a high friction surface/perforated bed, and the device further includes a hand-cocked, spring-driven vacuum solenoid or diaphragm. In operation, the check or document is positioned on the perforated bed. At the start of the scanning operation, the moving MICR/image module trips a photo sensor or other suitable sensing device that senses the start of the scanning operation. The sensor has multiple functions, such as turning on the MICR read head and image sensor module. In addition, tripping the sensor releases the spring-driven vacuum solenoid or vacuum diaphragm which is packaged under the bed and had been manually cocked prior to the start of the scan.

The vacuum solenoid or diaphragm creates a vacuum which is ducted to a chamber under the perforated bed. The vacuum acting through the perforations in the bed, and the Bernoulli effect due to airflow direction, securely holds the check or document during scanning and reading operations.

Advantageously, this retention methodology in a hand-operated system eliminates skew and securely retains the checks or documents. The vacuum solenoid or diaphragm is preferably sized to maintain this vacuum over the maximum time required to scan the largest allowed document. The uncovered perforations in the high friction bed provide the only path to bleed off the vacuum. Accordingly, the rate at which the vacuum bleeds off is regulated by the size of the check or document and the percentage of perforations exposed. In this way, the bleed off rate of the vacuum is self-regulating in that a large check with a longer scan time will expose fewer perforations and hold the vacuum longer than a small check with a shorter scan time.

In a second contemplated implementation, the bed or base of the device includes the high friction surface/perforated bed, and the device further includes a manually spun-up inertia wheel that drives fans, mounted under the perforated bed. In this implementation, tripping the sensor at the start of the scanning operation engages a clutch on the inertia wheel which is packaged under the bed and had been manually spun-up prior to the start of the scan.

When the clutch is engaged, the fans which are mounted under a chamber under the perforated bed, draw a vacuum under the document. The vacuum acting through the perforations in the bed, and the Bernoulli effect due to airflow direction, securely holds the check or document during scanning and reading operations.

Advantageously, this retention methodology in a hand-operated system eliminates skew and securely retains the checks or documents. The inertia wheel system is preferably sized to maintain this vacuum over the maximum time required to scan the largest allowed document. The inertia wheel may also be arranged to drive the scan module over the check or document being processed, but this is not required and the operator may provide the force necessary to drive the scan module.

The uncovered perforations in the high friction bed provide the only path for the fans to pull air. Accordingly, the amount of vacuum and the total air flow is regulated by the size of the check or document and the percentage of perforations exposed. In this way, the vacuum is self-regulating in that a large check with a longer scan time will expose fewer perforations and hold higher vacuum longer than a small check with a shorter scan time.

DETAILED DESCRIPTION OF THE PREFERRED EMBODIMENTS

The E-13B character set contains ten characters and four symbols as defined in the ANS X9.100-20-2006 (formerly published as X9.27) "Print and Test Specifications for Magnetic Ink Printing (MICR)" as published by Accredited Standards Committee X9, Inc., Annapolis, Md., United States. When used on a document for automated machine reading, the characters and symbols in the set must be printed using magnetic ink. ANS X9.100-20-2006 defines the dimensions of each character/symbol and the expected nominal waveform peak position and relative amplitude of waveform peaks.

Figure 1:
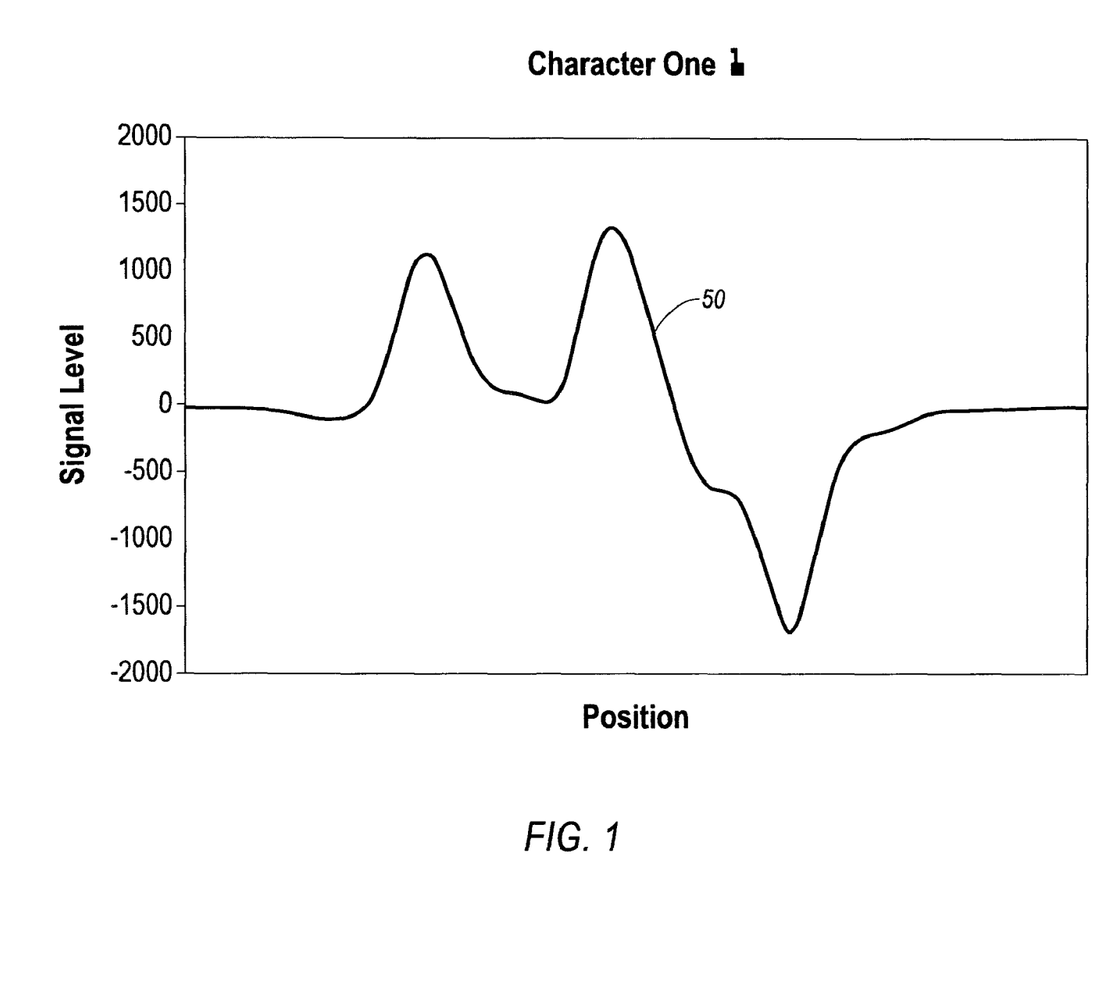
FIG. 1 shows the waveform for the magnetic ink character one, from the E-13B MICR character set as used on many financial payment documents, as read from a responsive magnetic signal gap read head when the magnetized character is passed by the magnetic read head.

FIG. 1 shows the waveform for the magnetic ink character one, from the E-13B MICR character set, as read from a responsive magnetic signal gap read head when the magnetized character is passed by the magnetic read head. The waveform is indicated at 50. As illustrated, the x-axis represents the position of the read head, and the y-axis represents the signal level.

MICR reading and recognition generally involves determining peak position information for a waveform generated by a single gap magnetic read head that passes over the magnetic ink characters on a document. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in ANS X9.100-20-2006.

Figure 2:
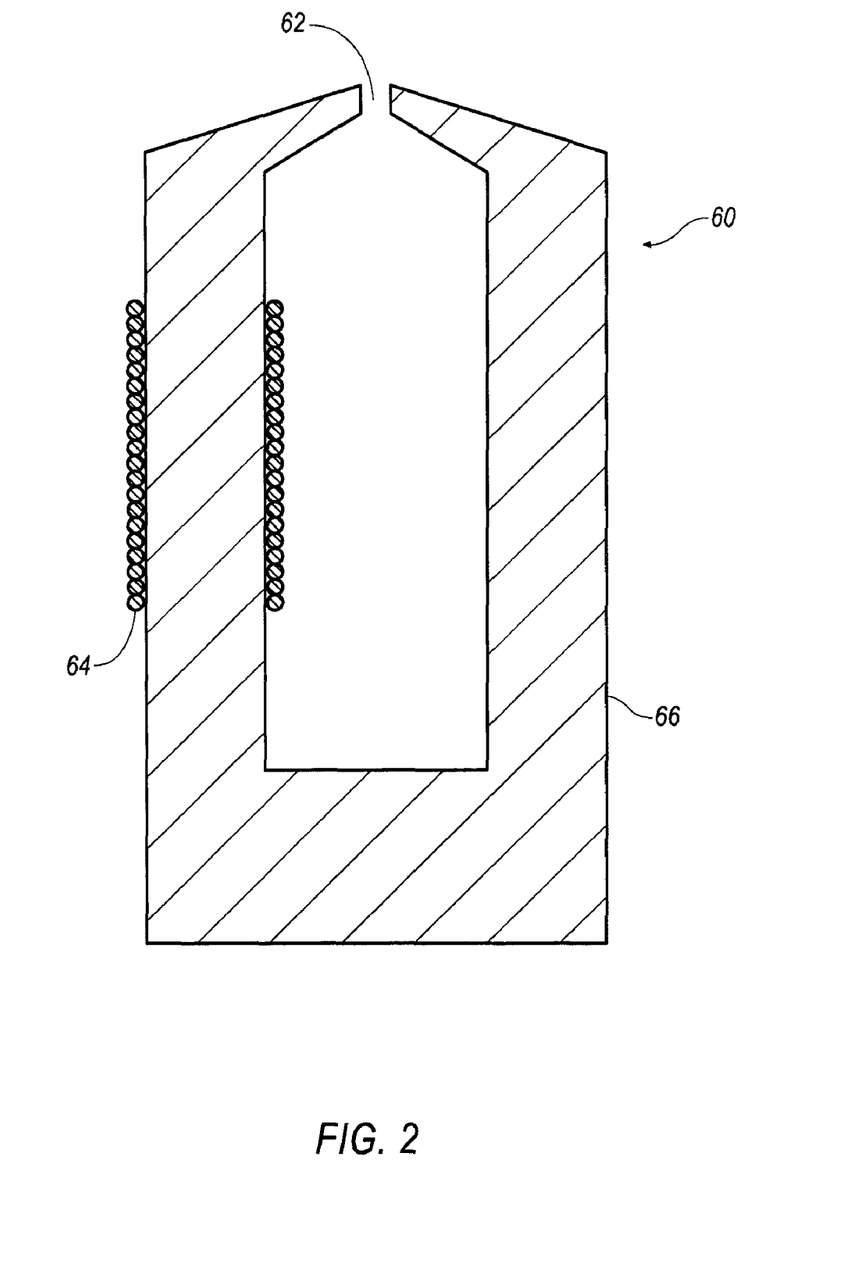
FIG. 2 is a cross-section view of a read head, which is one example of a suitable read head for reading magnetic ink characters.

In FIG. 2, a read head is generally indicated at 60, and includes a gap 62. The read head utilizes sensing coil 64. Core 66 forms a path for the magnetic flux changes experienced when the reader passes over magnetic ink. Of course, it is appreciated that alternative readers may be used, and any suitable technique may be utilized for assuring that flux variation from the magnetic ink characters is sensed.

Figure 3:
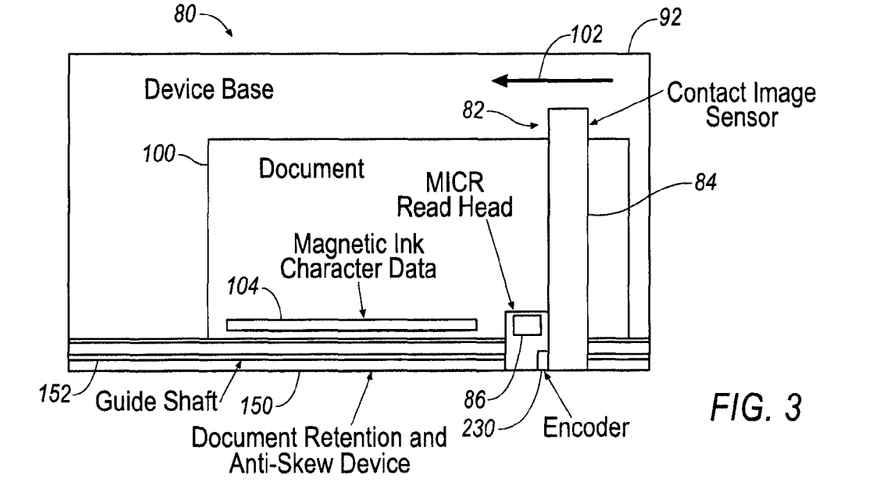
FIG. 3 illustrates a top view of a hand-operated document reader/imager made in accordance with the invention.
Figure 4:
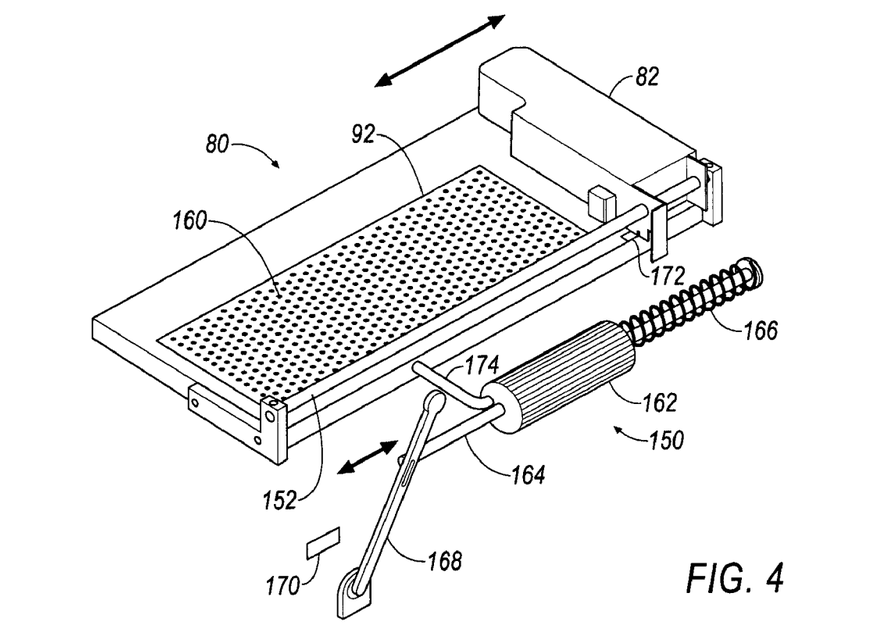
FIG. 4 illustrates a schematic diagram depicting the document retention and anti-skew device in a first embodiment, with the document processor bed empty.
Figure 5:
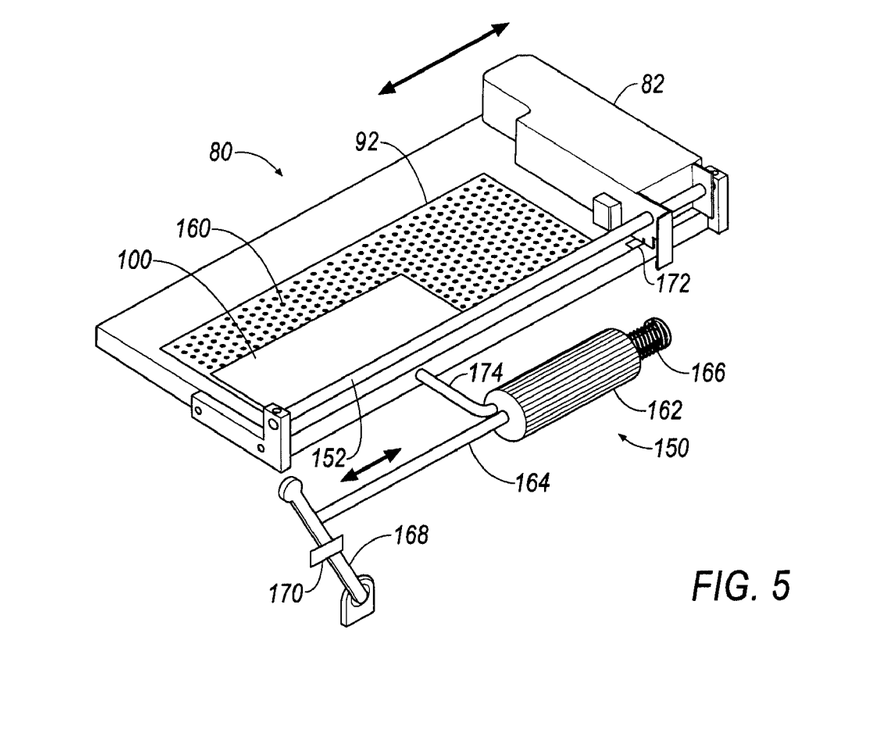
FIG. 5 illustrates a schematic diagram depicting the document retention and anti-skew device in the first embodiment, with a document positioned on the document processor bed.

A first exemplary embodiment of the invention is illustrated in FIGS. 3-5. FIGS. 3-5 illustrate a hand-operated document reader/imager 80. As best shown in FIG. 3, document reader/imager 80 includes a moving MICR/image subsystem 82. Subsystem 82 includes a contact image sensor 84, and a MICR read head 86. Contact image sensor 84 captures an image of the document 100 when subsystem 82 is moved across the document 100. Contact image sensor 84 captures the front image of the document 100 when the document 100 is placed face-up on the base 92 of the reader/imager 80 and the MICR/image subsystem 82 is moved from right to left over document 100 as indicated by arrow 102.

MICR read head 86 is for reading the magnetic ink character data 104 on document 100. During the front image capture, the MICR code line is read according to a traditional MICR algorithm as MICR read head 86 passes from right to left over the magnetic ink character data 104 on document 100.

With continuing reference to FIGS. 3-5, in the typical operation, the operator provides the force needed to move the MICR/image subsystem 82 over the document 100. Moving MICR/image subsystem 82 rides along a linear guide shaft 152 and holds the contact image sensor 84 and the magnetic read head 86. The magnetic read head 86 reads the MICR code line 104 at the bottom of the document 100, and the contact image sensor 84 scans the document 100.

In operation, with the MICR/image subsystem 82 at the start position (as depicted in FIGS. 4 and 5), a document 100 is positioned on the base 92 of the hand-operated reader/imager 80 (as depicted in FIG. 5). The operator slides the MICR subsystem 82 across the length of the check or document being scanned.

In accordance with the invention, a document retention device 150 includes manually-powered anti-skew methodology. In the implementation specifically illustrated in FIGS. 4 and 5, the base 92 of the document reader/imager 80 includes a high friction surface. Further, base 92 includes a perforated bed 160. A hand-cocked, spring-driven vacuum solenoid or diaphragm assembly includes vacuum solenoid 162, actuating rod 164, and actuation driving spring 166.

In operation, the check or document 100 is positioned on the perforated bed 160 as shown in FIG. 5. Manual actuator lever 168 is pulled to compress spring 166 and latched at latch mechanism 170. In FIG. 5, lever 168 is shown in the latched position. At the start of the scanning operation, the moving MICR/image module 82 trips a photo sensor 172. Any other suitable sensor may be used in the alternative. The sensor 172 has multiple functions, such as turning on the MICR read head 86 and image sensor module 84. In addition, tripping the sensor 172 releases the spring-driven vacuum solenoid 162 which is packaged under the bed (FIGS. 4 and 5 schematically illustrate the mechanism to facilitate understanding of the concept) and had been manually cocked prior to the start of the scan.

The vacuum solenoid 162 creates a vacuum which is ducted by vacuum line 174 to a chamber under the perforated bed 160. The vacuum acting through the perforations in the bed 160, and the Bernoulli effect due to airflow direction, securely holds the check or document 100 during scanning and reading operations.

Advantageously, this retention methodology in a hand-operated system eliminates skew and securely retains the checks or documents. The vacuum solenoid 162 is preferably sized to maintain this vacuum over the maximum time required to scan the largest allowed document. The uncovered perforations in the high friction bed 160 provide the only path to bleed off the vacuum. Accordingly, the rate at which the vacuum bleeds off is regulated by the size of the check or document 100 and the percentage of perforations exposed. In this way, the bleed off rate of the vacuum is self-regulating in that a large check with a longer scan time will expose fewer perforations and hold the vacuum longer than a small check with a shorter scan time.

Figure 6:
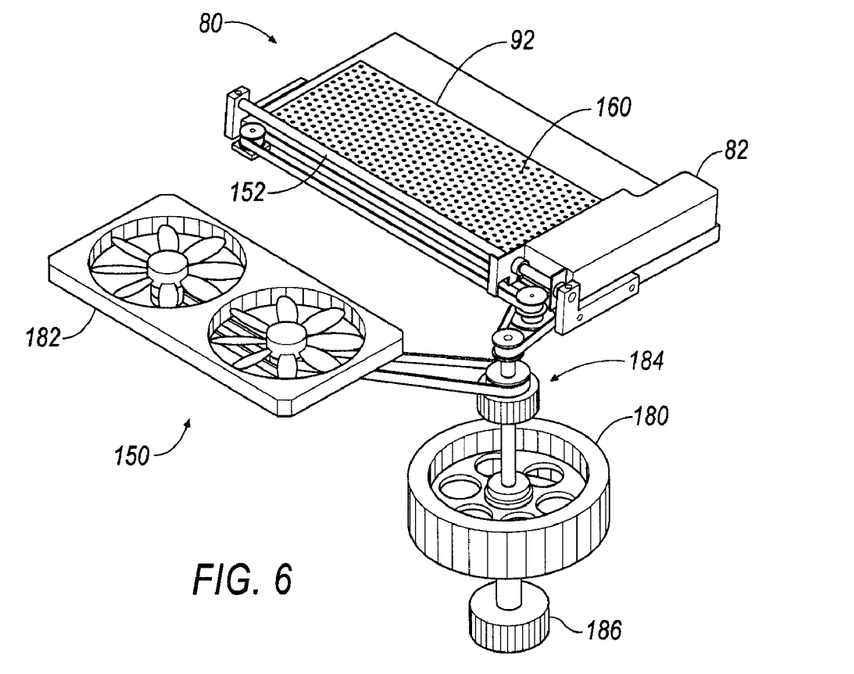
FIG. 6 illustrates a schematic diagram depicting the document retention and anti-skew device in a second embodiment, with the document processor bed empty.
Figure 7:
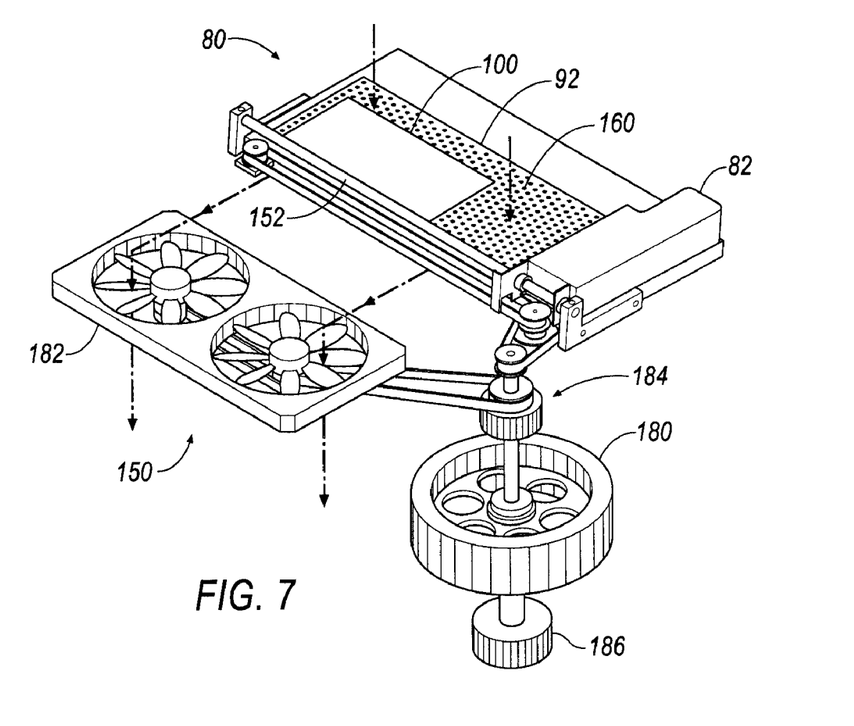
FIG. 7 illustrates a schematic diagram depicting the document retention and anti-skew device in the second embodiment, with a document positioned on the document processor bed.

In a second contemplated implementation shown in FIGS. 6 and 7, the bed or base 92 of the device 80 includes the high friction surface/perforated bed 160, and the device 80 further includes a manually spun-up inertia wheel 180 that drives fans 182, mounted under the perforated bed 160 (shown out of position to better illustrate the concept). In this implementation, tripping the sensor 172 or other suitable engagement switch at the start of the scanning operation engages a clutch 184 on the inertia wheel 180 which is packaged under the bed and had been manually spun-up prior to the start of the scan.

When the clutch 184 is engaged, the fans 182 which are mounted under a chamber under the perforated bed 160, draw a vacuum under the document 100 (FIG. 7). The vacuum acting through the perforations in the bed 160, and the Bernoulli effect due to airflow direction, securely holds the check or document 100 during scanning and reading operations.

The inertia wheel 180 and associated components are preferably sized to maintain this vacuum at least over the maximum time required to scan the largest allowed document. The inertia wheel 180 may also be arranged to drive the scan module 82 over the check or document 100 being processed as shown, but this is not required and the operator may provide the force necessary to drive the scan module.

In more detail, with continuing reference to FIGS. 6 and 7, in operation of this embodiment, once the document 100 is positioned on the base 92 of the hand-operated document reader/imager 80, the inertia wheel 180 is spun up. A generic spin-up mechanism is depicted at 186. The operator presses the release to engage clutch 184 to drive the movable MICR/image subsystem 82. The energy stored in the inertia wheel 180 drives the moving MICR/image subsystem 82 over the face of the document 100 at a controlled speed.

The inertia wheel 180 and drive ratio should be sized so that the energy stored in the spinning inertia wheel 180 will be much larger than the required energy to accelerate the mass of the scan subsystem 82 and overcome the system drag and the load of the return spring (not shown), so that the speed of the scan will be nearly constant. With a properly sized inertia wheel 180, it should be possible to scan multiple documents before the wheel speed drops low enough to require re-acceleration.

The uncovered perforations in the high friction bed 160 provide the only path for the fans 182 to pull air. Accordingly, the amount of vacuum and the total air flow is regulated by the size of the check or document 100 and the percentage of perforations exposed. In this way, the vacuum is self-regulating in that a large check with a longer scan time will expose fewer perforations and hold higher vacuum longer than a small check with a shorter scan time.

Typically, a signal indicative of the speed of the MICR subsystem 82 is provided to the MICR reading and recognition logic during the scan operation. In order for the image sensor and magnetic read head to properly read the check or document, the speed of the module must be known over the entire length of the item being scanned. The speed of the scan can be measured by any one of a number of speed measuring devices. The greater the variation of speed, the more sophisticated, and therefore more expensive, the electronics must be, as well as the greater the chance of error. A hand-operated document reader/imager requires a method of determining the position, and thus the speed, of the MICR and image sensors due to the variable speed nature of the manual operation. Existing solutions use optical encoders to provide this position feedback. Optical encoders are typically attached directly to the shaft of a wheel that moves along the document being scanned, or are connected to this shaft through a series of gears. For example, as shown in FIG. 3, a suitable encoder 230 measures the speed of the MICR subsystem. An output signal from encoder 230 is provided to the MICR reading and recognition logic during the scan operation.

Figure 8:
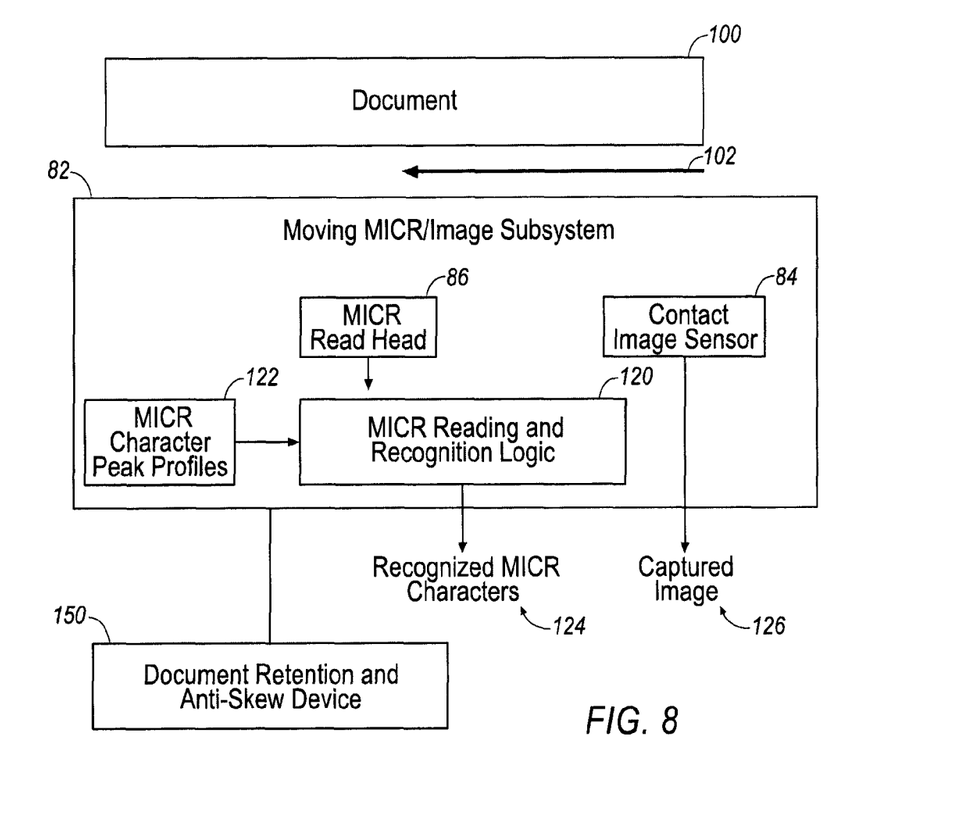
FIG. 8 is a block diagram illustrating a moving MICR/image subsystem including a document retention and anti-skew device.

FIG. 8 illustrates the moving MICR/image subsystem 82 in block diagram form, including the contact image sensor 84, MICR read head 86, and document retention and anti-skew device 150 which may take the form of the above-described vacuum solenoid mechanism or inertial wheel mechanism. As shown, the document 100 is placed on the base of the reader/imager for front image capture. Moving MICR/image subsystem 82 is moved across the document 100 as indicated by arrow 102. Block 120 represents the MICR reading and recognition logic. Logic 120 includes a traditional MICR algorithm as understood by one of ordinary skill in the art.

In the traditional MICR algorithm, the waveform obtained from the read head 86 is compared against known MICR character peak profiles 122. If the recognition is successful, the MICR reading and recognition logic 120 determines the recognized MICR characters 124. The traditional MICR algorithm is applied during the front image capture by contact image sensor 84 of a face-up document. The captured image is indicated at 126.

Logic 120 must be capable of determining the speed of the MICR and image sensors due to the variable nature of the manual operation. In accordance with the invention, retention and anti-skew device 150 retains the document 100 against the device bed. Speed feedback to the MICR reading and recognition logic 120 may be provided in any suitable way.

Figure 9:
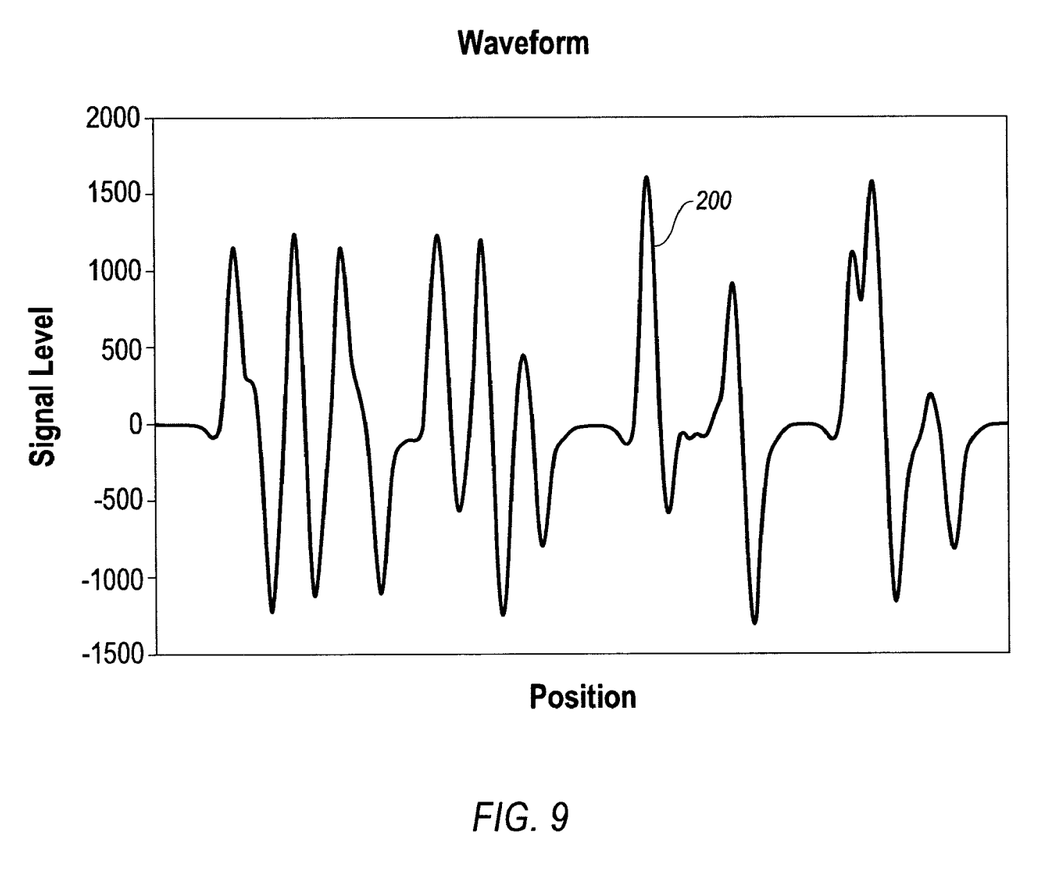
FIG. 9 illustrates a waveform for magnetic ink characters/symbols 3, 5, 7, Amount when the document containing the characters/symbols is inserted face up for front image capture in the hand-operated document reader/imager, and the magnetic ink characters/symbols are passed over from right to left.

FIG. 9 illustrates a waveform 200 for magnetic ink characters/symbols 3, 5, 7, Amount when the document containing the characters/symbols is inserted face up for front image capture in the hand-operated document reader/imager, and the magnetic ink characters/symbols are passed over from right to left. As illustrated, the x-axis represents the position of the read head, and the y-axis represents the signal level. The MICR reading and recognition logic is able to produce the waveform depicted at 200 based on the signal from the MICR read head and the speed feedback signal. In this way, the MICR reading and recognition logic can consider the MICR read head speed during reading and recognition. Consideration of MICR read head speed is required because speed variations affect the amount of time between the peaks of each character (as well as the amplitudes of the peaks due to the variation in the rate of change of the magnetic flux resulting from the variation in the read head speed). By considering the read head speed, the time information is able to be converted into distance information, which can be compared to the MICR character peak profiles as contained in ANS X9.100-20-2006.

In one implementation, in order to obtain optimal MICR results, the MICR read head signal is sampled at a resolution of 1,000 samples per inch. The sampling rate of the MICR subsystem is varied based on the sensed speed. For example, in order to achieve 1,000 samples per inch, a speed feedback mechanism commands the MICR sampling subsystem to sample every 0.001 inches. In the embodiments of the invention illustrated in FIGS. 3-8, this speed feedback is provided by the encoder 230. Similarly, speed feedback could be used to command the imaging subsystem to achieve a desired samples/inch resolution.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hand-operated document processor comprising:
   a base including a perforated bed for receiving a document containing magnetic ink character data to be read and recognized, the base defining a chamber under the perforated bed;
   a manually operated moving magnetic ink character recognition (MICR) subsystem, the subsystem including a MICR read head and being attached to the base such that movement of the subsystem causes the MICR read head to pass over the magnetic ink character data on the document;
   MICR reading and recognition logic receiving the signal from the MICR read head; and
   a document positioning and retentioning device connected to the base, and including a manually-powered anti-skew device for creating a vacuum, wherein the created vacuum is provided to the chamber under the perforated bed such that the vacuum, acting through the perforations, securely holds the document during the scanning operation.

2. The hand-operated document processor of claim 1 wherein the manually-powered anti-skew device comprises a spring-driven vacuum solenoid.

3. The hand-operated document processor of claim 2 wherein the vacuum solenoid is sized to maintain the vacuum over the maximum time required to scan a document that is the full size of the base.

4. The hand-operated document processor of claim 2 further comprising:
   a lever for connected to the spring-driven vacuum solenoid; and
   a latch wherein the operator latches the lever to prepare the spring-driven solenoid prior to the start of the scanning operation.

5. The hand-operated document processor of claim 4 further comprising:
   a sensor for sensing the start of the scan operation by detecting movement of the MICR subsystem, wherein upon detection by the sensor of the start of the scan operation, the spring-driven vacuum solenoid is released from the latch to cause the spring to drive the solenoid and create the vacuum.

6. The hand-operated document processor of claim 2 further comprising:
   an encoder providing speed feedback information as the MICR read head passes over the magnetic ink character data on the document, the MICR reading and recognition logic further receiving the speed feedback information for use during character data recognition.

7. The hand-operated document processor of claim 2 wherein the moving MICR subsystem further comprises:
   an image sensor that passes over the document as the MICR read head passes over the magnetic ink character data on the document.

8. The hand-operated document processor of claim 1 further comprising:
   a linear guide shaft engaging the moving MICR subsystem for guiding the motion of the moving MICR subsystem.

9. The hand-operated document processor of claim 1 wherein the manually-powered anti-skew device comprises an inertia wheel and at least one fan driven by the inertia wheel.

10. The hand-operated document processor of claim 9 wherein the at least one fan is mounted under, the chamber under the perforated bed.

11. The hand-operated document processor of claim 9 wherein the inertia wheel is sized to maintain the vacuum over the maximum time required to scan a document that is the full size of the base.

12. The hand-operated document processor of claim 9 further comprising:
   a clutch mechanism for drivingly connecting the inertia wheel to the at least one fan.

13. The hand-operated document processor of claim 12 further comprising:
   a sensor for sensing the start of the scan operation by detecting movement of the MICR subsystem, wherein upon detection by the sensor of the start of the scan operation, the clutch mechanism is engaged to cause the inertia wheel to drive the at least one fan.

14. The hand-operated document processor of claim 9 further comprising:
   an encoder providing speed feedback information as the MICR read head passes over the magnetic ink character data on the document, the MICR reading and recognition logic further receiving the speed feedback information for use during character data recognition.

15. The hand-operated document processor of claim 9 wherein the moving MICR subsystem further comprises:
   an image sensor that passes over the document as the MICR read head passes over the magnetic ink character data on the document.

* * * * *